July 10, 1956     F. C. WIEMERS     2,753,661
STRINGER AND PLANTER Filed Nov. 3, 1953     6 Sheets-Sheet 1

Fig. 1

Frank C. Wiemers
INVENTOR.

July 10, 1956

F. C. WIEMERS

2,753,661

STRINGER AND PLANTER

Filed Nov. 3, 1953

Frank C. Wiemers
INVENTOR.

BY
*Attorneys*

July 10, 1956

F. C. WIEMERS 2,753,661

STRINGER AND PLANTER

Filed Nov. 3, 1953

Frank C. Wiemers
INVENTOR.

BY *Clarence A. O'Brien*
*and Harvey B. Jackson*
Attorneys

July 10, 1956  F. C. WIEMERS  2,753,661
STRINGER AND PLANTER
Filed Nov. 3, 1953  6 Sheets-Sheet 6

Frank C. Wiemers
INVENTOR.

BY Clarence A. O'Brien
and Harvey B. Jacobson
Attorneys

United States Patent Office 2,753,661
Patented July 10, 1956

2,753,661

STRINGER AND PLANTER

Frank C. Wiemers, Cheshire, Oreg.

Application November 3, 1953, Serial No. 389,915

15 Claims. (Cl. 47—1)

This invention relates generally to farm machinery and pertains more particularly to an improved form of stringing and planting mechanism.

A primary object of this invention is to provide an improved machine for performing simultaneously the stringing of a horizontal cord or a series of vertically spaced horizontal cords, wires or the like between a series of posts disposed in a field and wrapping vertical flights of cord between the horizontal cords to effect a trellis structure for crops.

Another object of this invention is to provide an improved form of stringing machine which is automatic in operation and requires only a guiding of the machine by the operator.

Still another object of this invention lies in the provision of an improved stringing and planting mechanism having an attached planter for periodically planting in timed relation to the stringing operation.

A further object of this invention is to provide a machine in conformity with the foregoing object wherein the horizontal stringing and vertical wrapping are so related as to operate in timed relation for most effectively producing the desired result.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
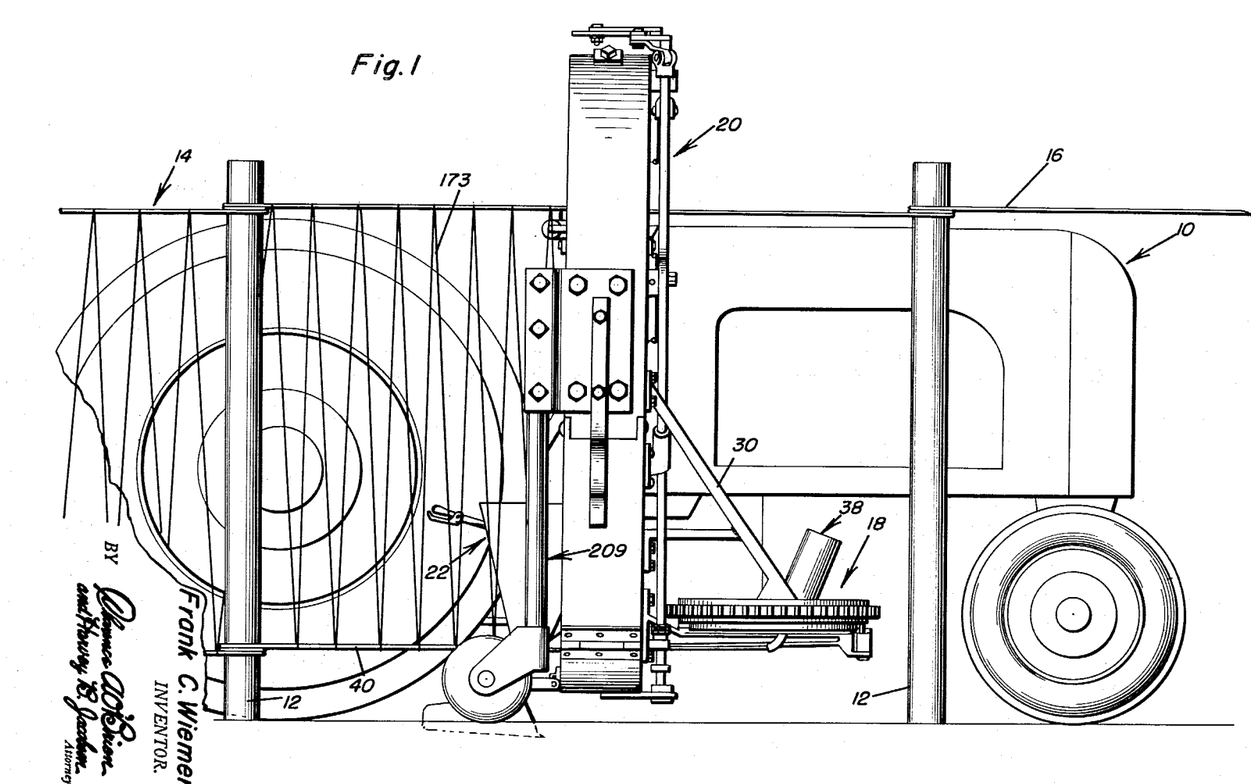
Figure 1 is a side elevational view of the mechanism in operation.

Referring now more particularly to Figure 1, reference numeral 10 indicates generally a tractor or similar vehicle of any suitable type to which the improved stringing and planting mechanism is to be attached. Reference numeral 12 indicates a series of upright posts disposed in spaced relation along a field and between which the trellis assembly indicated generally by the reference character 14 is to be erected, while reference character 16 indicates generally the horizontal wire or cord or similar flexible material strung between the posts in substantially horizontal relation with the ground in the manner shown.

It is to be noted that the hereinafter described mechanism is to be utilized in conjunction with a viny crop such as beans or the like and it is to be understood that the uppermost cord or wire 16 is normally maintained from year to year while the hereinafter described lower wire or cord and the vertical flights of the trellis are removed after harvesting operation of the crop so that routine farming operations such as plowing, cultivating and the like can be performed without becoming entangled in the trellis structure. It is also to be noted that the hereinafter described assembly may be utilized to string both horizontal wires by a simple duplication of structure.

The machine consists essentially of three basic component parts which are the horizontal stringing mechanism indicated generally by the reference character 18, the vertical string apparatus indicated generally by the reference character 20 and the planting assembly indicated generally by the reference character 22, all of these portions of the machine being carried by the tractor and so inter-related in one manner or another to be effectively dependent upon one another for their operation in most effectively erecting the trellis structure and performing the planting operation.

Horizontal stringing apparatus

The horizontal stringing apparatus consists primarily of a pair of spaced semi-circular rail members 24 and 26 which are suitably carried as by brace members 28 and 30 by the vertical stringing assembly indicated by the reference character 20 and it will be seen that a generally C-shaped carrier member indicated generally by the reference character 32 is mounted for movement along these rail members in the manner shown. In this respect, the carrier member may be preferably formed channel-shaped in cross section having legs 34 disposed above and below the rail members 24 and 26. It will further be noted that the carrier member 32 is provided on its outer circumference with a series of gear teeth members 36 for a purpose presently apparent.

A container 38 is supported on the carrier mechanism and is carried thereby and the container may be provided with a supply of cord 40 which may issue therefrom as the tractor assembly moves between the post members 12 to string the cord therebetween. The purpose of the carrier and rail assembly is to provide a gate indicated generally by the reference character 41 through which the post members 12 sequentially pass whereupon they contact and manipulate the trip member 42 as will be presently apparent, stop the forward motion of the tractor and perform a rotation of the carrier about its rail assembly to effect a wrapping action of the cord 40 about the associated post 12, it being noted that an intermediate position of the carrier is such as to present the gate at the rear of the assembly whereupon subsequent reestablishment of the forward motion of the tractor will allow the associated post to pass therethrough for operation upon the vertical stringing apparatus 20, means, as will be seen presently, being provided for returning the carrier assembly to the initial position.

Figure 2:
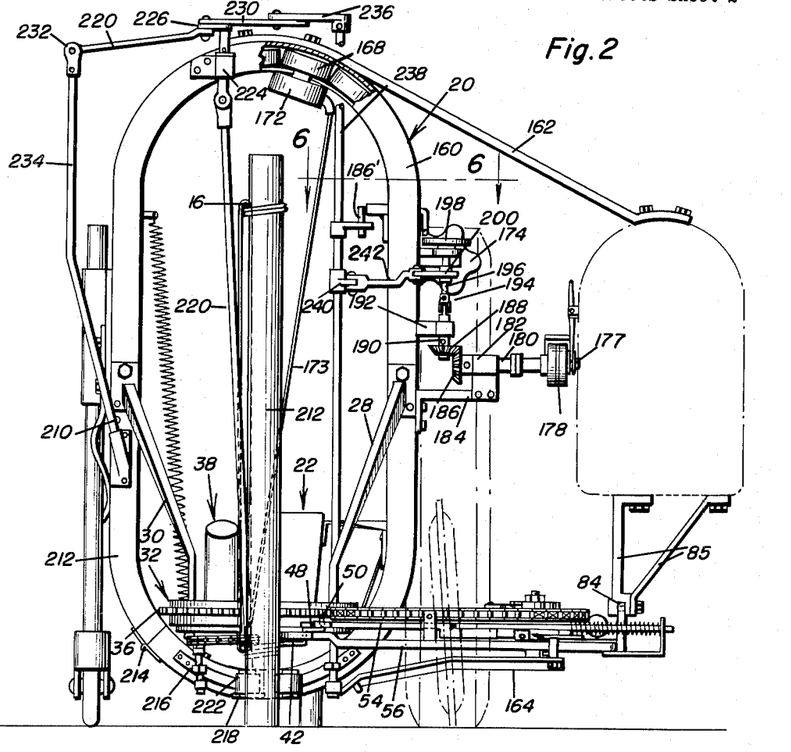
Figure 2 is a front elevational view of the assembly shown in Figure 1.
Figures 3, 5, 14, 15:
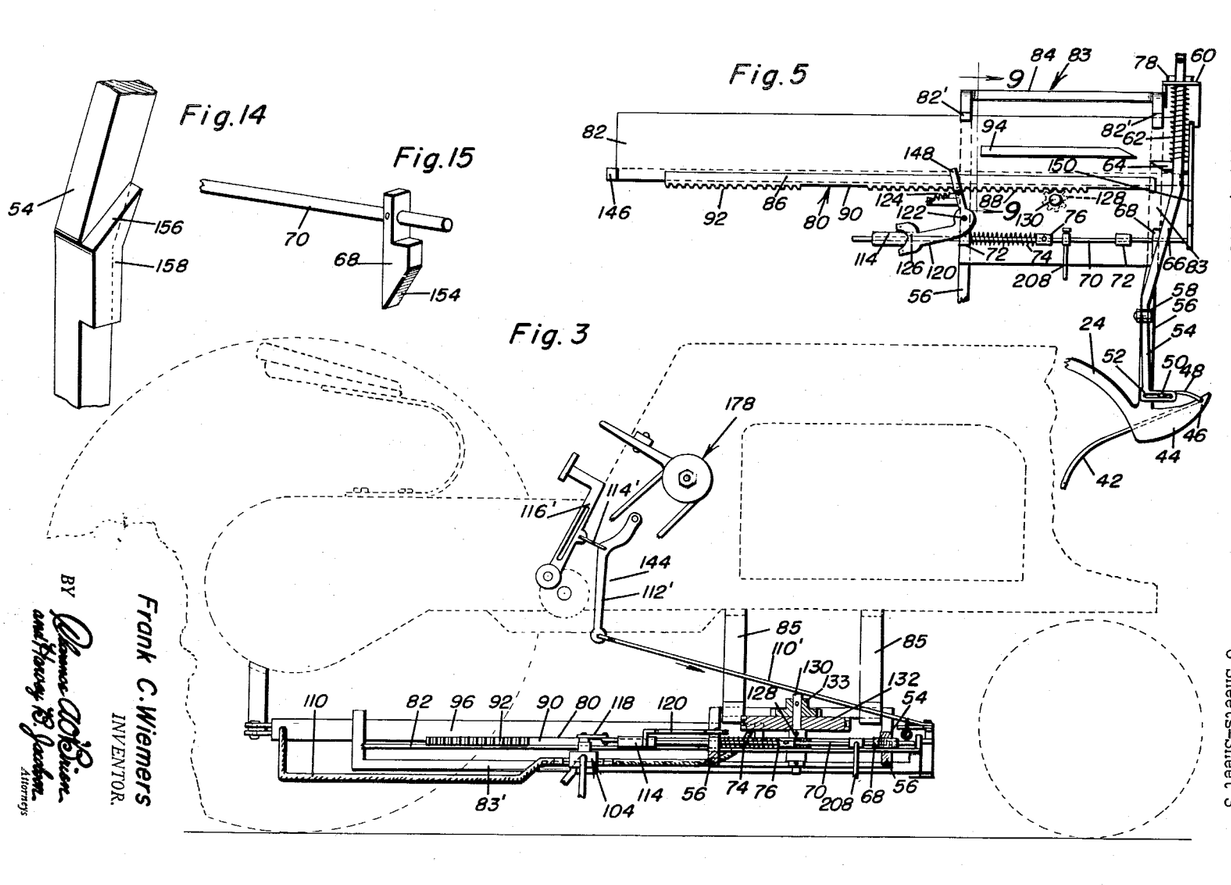
Figure 3 is a vertical section taken longitudinally through the assembly showing a portion of the operating mechanism therefor.
Figure 5 is a plan view of a portion of the machine showing the rack and cam mechanism on an enlarged scale.
Figure 14 is an enlarged perspective view of a portion of the clutch and valve actuating arm.
Figure 15 is an enlarged perspective view of one end of the cam actuating mechanism.

Referring now more particularly to Figures 2 and 5, it will be seen that the rail 24 is provided with a downwardly offset guide bracket 44 through which a vertically extending portion, overlying bracket 44, of the trip member 42 is rotatably received as indicated by the reference character 46 and that the opposite end 48 of the trip member, underlying bracket 44, is provided with an upwardly extending end portion 50 received within the elongated slot 52 in the actuating arm member 54. As seen, the rail member 24 may be provided with additional support frames 56 in the manner shown. The actuating arm member 54 is slidably received in the bracket assembly 58 and 60 respectively for movement in a longitudinal direction upon rotation of the trip member 42 as will be apparent. The inner end of the actuating arm receives a coil spring 62 between the cam element 64 thereon and the bracket assembly 60 for normally urging the actuating arm and its associated trip member to the position shown. An intermediate cam portion 66 of the actuating arm abuts a projecting element 68 on the valve actuating plunger 70 for imparting longitudinal movement thereto for a purpose presently apparent, this plunger being slidably carried transversely to the actuating arm by means of suitable bearings such as that indicated by the reference character 72 and normally urged to a position to the right in Figure 5 by the coil spring 74 in engagement therewith and with the collar 76 on the plunger. A stop pin 78 is provided on the actuating arm whose purpose will also be presently apparent.

Reference character 80 indicates the rack assembly generally and which includes the plate member 82 slidably carried longitudinally of the tractor and by the bracket assembly 83 which embodies a horizontal leg 84 affixed to the tractor by suitable brace arms 85. It will be noted that the previously described support frames 56 are connected to leg 84 slidably supporting the plate member 82 in the manner shown most clearly in Figure 9. It will also be seen that the members 56 have inverted generally L-shaped ears 82' engaging over and guiding the inner edge of the plate 82. At the opposite side of plate 82 a depending rail member 83', connected at its opposite upturned ends to the plate is provided which engages with stop blocks 84' on the frame members 56, in the manner shown to constrain the plate against outward sliding movement away from the bracket structure 83.

At one edge of plate 82 is secured the interrupted rack member 86 having, respectively, the forward rack teeth 88, the interrupted space 90 and the rearward rack teeth 92. The upper surface of the plate member 82 carries a cam member 94 engageable with the previously described cam member 64 provided on the actuating arm 54. As seen most clearly in Figure 4, a double-acting piston and cylinder arrangement 96 is suitably secured to the tractor as at 98 and its other end is provided with the piston rod 100 connected to a suitable clevis joint 102 to the rack mechanism. The valve 104 located on the tractor is provided with a pressure inlet line 106, a return line 108 and pressure lines 110 and 112 leading to opposite ends of the cylinder and piston arrangement 96 for operation of the same in opposite directions. In the position shown in Figure 4, the valve is in a neutral position wherein the flow of hydraulic fluid is through the inlet line 106 and outwardly through the return line 108 with no connection to either of the lines 110 or 112.

Figures 4, 10:
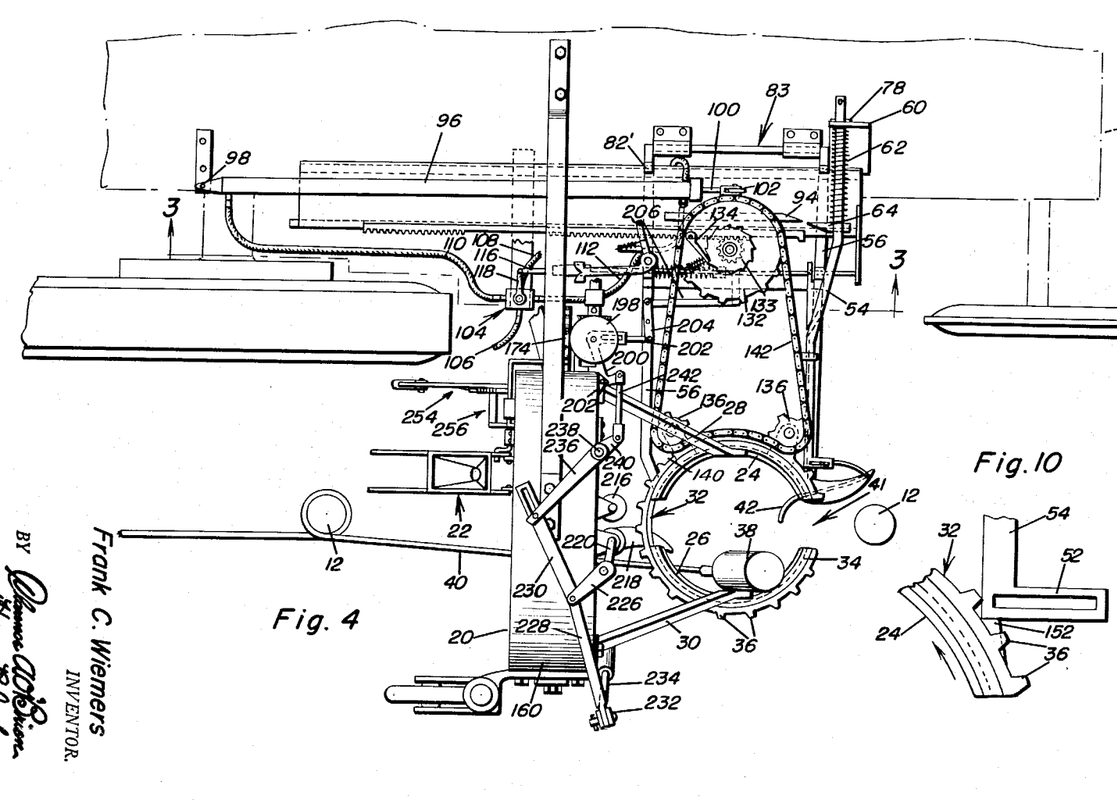
Figure 4 is a top plan view of the mechanism.
Figure 10 is an enlarged view showing a portion of the horizontal stringing mechanism.
Figures 6, 11, 12, 13:
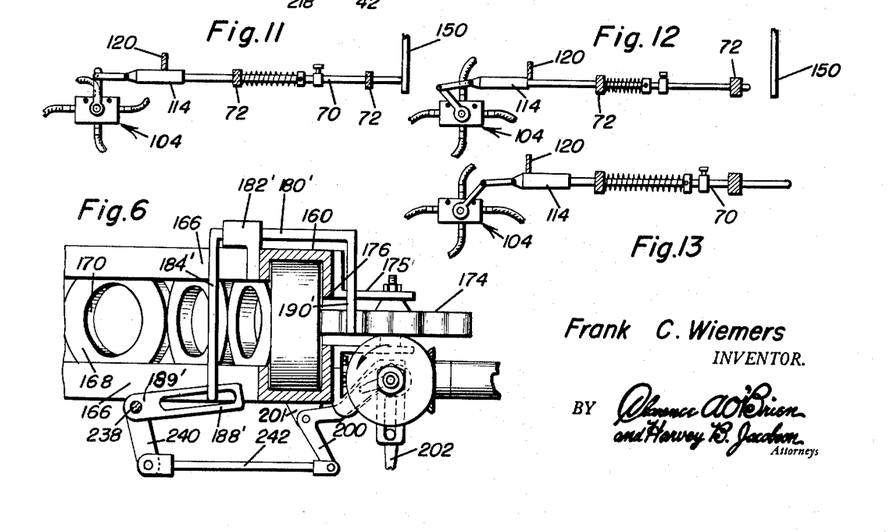
Figure 6 is a horizontal section taken substantially along the plane of section line 6—6 of Figure 2 showing details of the vertical stringing mechanism on an enlarged scale.
Figure 11 is a plan view of the valve actuating mechanism in one position.
Figures 12 and 13 are views similar to Figure 11 but showing the valve mechanism in different positions of operation.

The previously mentioned valve plunger 70 is provided at one end with an enlarged head 114 which is connected through the link 116 to the valve control arm 118 for operation of the valve 104 and it will be manifest that upon rotation of the trip member 42 the actuating arm 54 will be moved in a longitudinal direction to push the plunger 70 to the left in Figure 5 wherein the holding yoke 120 will be urged about its pivotal axis 122 under the action of the spring 124 to engage with one shoulder 126 of the enlarged head 114 so as to hold the valve plunger in a position extended to the left in Figure 5, wherein the valve arm 118 will be moved to the position shown in Figure 12 effecting operation of the piston rod 100 to the right in Figure 4 for moving the rack therewith. The first toothed portion 88 will engage with the pinion member 128 secured to the shaft 130 upon which the gear 132 is loosely journaled and upon which is also firmly secured the ratchet wheel 133 engaged by the pawl 134 on the gear 132 so that movement in this direction of the piston rod will effect rotation of the gear 132 but opposite direction of the rack and consequently the piston rod 100 will not effect rotation of this gear. Suitable sprockets 136 are carried by the brackets 140 on the rail members 24 and a flexible chain 142 is trained about the gear 132 and the sprockets 136 in engagement with the teeth 36 on the outer circumference of the carrier member 32 to effect rotation thereof in a counter-clockwise direction upon movement of the rack and piston rod 100 to the right in Figure 4. The length of the rack teeth 88 is such that one and one-half turns of rotation are imparted to the carrier member 32 wherein the opposite end thereof will be in register with the rearward ends of the rail members 24 and 26 to effect a gate at the rear thereof for passage therethrough on the post member 12 as will be readily apparent. Meanwhile, the initial movement of the rack assembly to the right will have engaged the cam member 94 on the same with the cam element 64 on the actuating lever so as to maintain this lever in the inwardly, longitudinally slid position wherein the inner end 95 of the lever will effect a declutching operation upon the tractor and stop forward motion thereof through the suitable linkage mechanism indicated generally by the reference character 144 and more fully described hereinafter. The lengths of the cam member 94 and the rack teeth 88 are so interrelated as to maintain disengagement of the tractor clutch until the pinion 128 is out of engagement with the rack teeth 88 whereupon the tractor clutch will be reengaged to effect forward movement of the tractor while the rack assembly interrupted portion 90 is passing the pinion 128. Forward movement of the tractor will then pass the horizontal stringing assembly beyond the post members 12 so that the latter passes through the gate provided at the rearward end of the assembly by the one and one-half rotation effect imparted to the carrier member, whereupon, the interrupted portion 90 of the rack assembly will have passed and the rearward rack toothed portion 92 will have become engaged with the pinion 128 to effect further rotation thereof bringing the carrier assembly to its initial position as shown in Figure 4. The net effect will have been to rack two complete turns of cord about the associated post. When the rack assembly has reached its fullest extent of travel, an upwardly directed ear 146 at the rearward end thereof will have engaged the arm 148 on the holding member 120 releasing the valve plunger 70 to move to its full extent to the right in Figure 5 wherein the valve assembly 103 will be in the position shown in Figure 13, this position of the valve effecting a reversal of flow to the piston and cylinder assembly 96 and thus effecting motion of the piston rod 100 to the left in Figure 5 for returning the rack to the initial position. When the rack has reached the initial position, the lateral ear 150 thereon engages the free end of the plunger 70 to return the valve to the position shown in Figure 11.

Figures 7, 8, 9, 20:
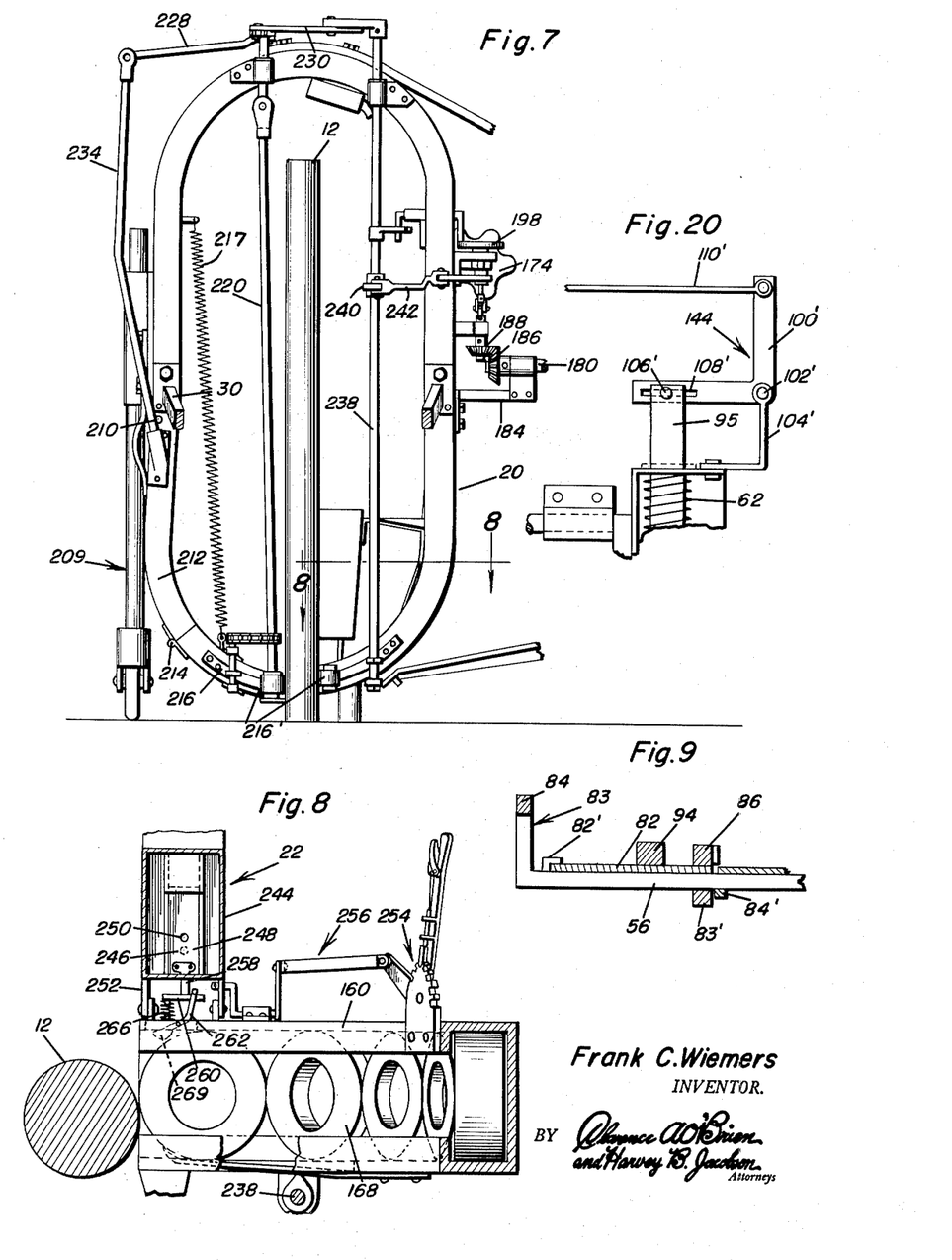
Figure 7 is an elevational view of the vertical stringing assembly showing the same in partially open position.
Figure 8 is a horizontal section taken substantially along the plane of section line 8—8 of Figure 7 showing details of the vertical stringing mechanism and associated planter.
Figure 9 is a vertical section taken substantially along the plane of section line 9—9 of Figure 5 showing the further details of the rack assembly.
Figure 20 is a plan view of the declutching assembly.
Figure 16:
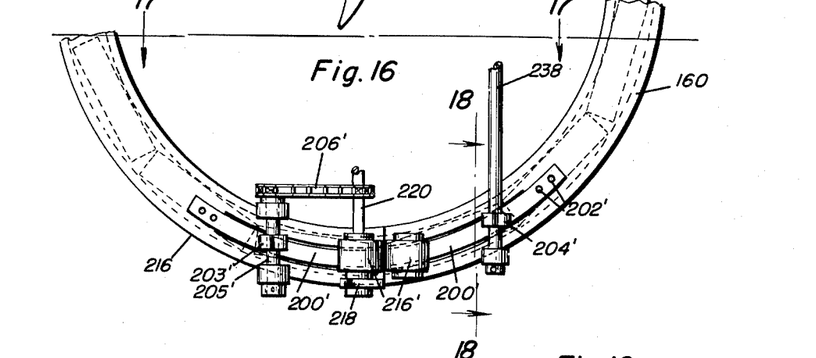
Figure 16 is an elevational view showing a portion of the vertical stringing assembly.
Figure 17:
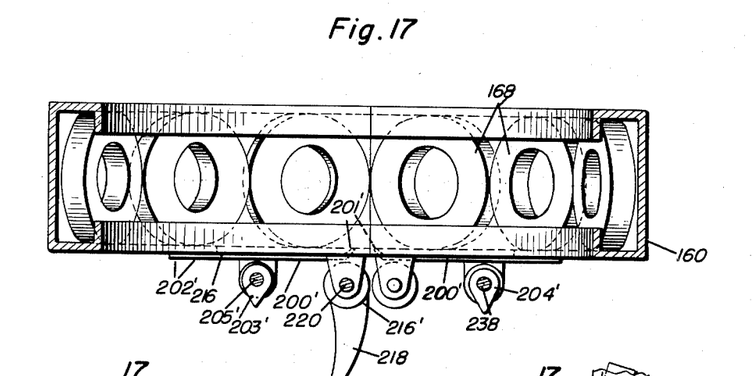
Figure 17 is a horizontal section taken along the plane of section line 17—17 in Figure 16.
Figure 18:
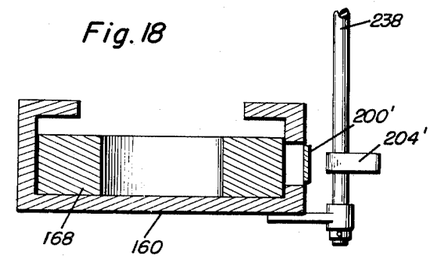
Figure 18 is a vertical section taken along line 18—18 of Figure 16.
Figure 19:
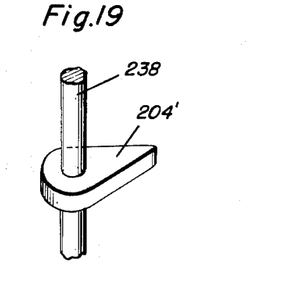
Figure 19 is a perspective view of one of the cam members.

Referring now more specifically to Figure 20, it will be seen that the declutching assembly 144 includes a bell crank 100' pivoted at its center by pin 102' to a bracket 104' carried by a support plate or assembly 83. The end 95 of member 54 carries a pin 106' engaged within a slot 108' in crank 100' and the opposite end of the crank is pivotally secured to drag link 110' which, as seen in Figure 3 connects to an idler arm 112' on the tractor and coupled through a link 114' to the conventional clutch pedal 116' thereof. It is contemplated that this mechanism be utilized to operate both the clutch and brake of the tractor simultaneously. In this manner, upon inward movement of member 54, the bell crank will be pivoted to simultaneously declutch and brake the tractor.

As shown most clearly in Figure 10, a lug 152 is provided on the carrier assembly 32 for engaging the outermost end of the actuating arm 54 to insure its proper location when the carrier assembly is in the position shown in Figure 4.

Referring now more particularly to Figures 14 and 15, it will be seen that the cam element 68 is provided with an inclined member 154 in engagement with the surface 156 on the cam element 158 of the actuating arm 54, which mutual interengagement and relative motion therebetween effects the carrying motion to the plunger 70.

Operation of the vertical stringer

Referring now more particularly to Figure 2, the vertical stringing assembly 20 consists essentially of a hollow frame member 160 suitably supported as by the bracket 162 and 164 to the tractor assembly and, as seen in Figure 6, the frame has inturned legs 166 at the inner side thereof in spaced parallel relation to present an opening therebetween, the frame being open at its side and presenting an enclosure in cross section. The discoidal elements 168 are provided with the central bores 170 extending therethrough and these elements are placed in the frame assembly 160 so that the elements substantially fill the frame. One of the elements carries the cord container 172 from which the vertical trellis cord 173 is issued and a sprocket 174 having its toothed portion projecting through an opening 176 in the outer side of the frame 160 and carried by the bracket ears 175 thereon engages within the central bores of the discoidal members 168 whereupon, upon rotation of the pinion or sprocket 174, the discoidal elements chase themselves around in a continuous path within the frame member 160 to carry the cord container 172 therearound to string the vertical trellis cord 173 around the existing horizontal upper cord 16 and the lower cord 40 in the manner shown, this stringing or wrapping action being effected in a sinusoidal pattern.

Referring now more particularly to Figure 2, it will be noted that the tractor assembly is provided with the usual power take-off shaft 177 which is coupled through a suitable mechanism 178 to the power input shaft 180 journaled in the bearing 182 carried by the bracket 184 on the frame 160. The free end of shaft 180 terminates in the bevel gear 186 mating with a similar gear 188 on the stub shaft 190 carried vertically by the bracket 192 and provided at its upper end with the universal joint coupling 194 securing this stub shaft to the articulated shaft 196 provided at its upper free end with the friction disk 198 engaging with one face of the sprocket 174, off-center of the same for driving engagement therewith. The shaft 196 is carried by the pivot crank 200 which is pivotally secured to the bracket ear 201 at its intermediate portion, the pivot crank 200 being normally spring urged in a direction to urge the friction disk 198 into engagement with the sprocket 174, as will be manifest. One end of the pivot crank 200 is connected to the link member 202 through the pin and slot connection shown, through the bell crank 204 and the drag link 206 to the arm 208 carried by the valve plunger 70 so that movement of the plunger assembly to the left as previously described will effect movement of the shaft 196 and consequently the friction disk 198 away from the sprocket 174 to disengage the drive thereto when the trip member 42 of the horizontal stringing assembly has actuated the tractor clutch to stop the forward motion of the tractor.

An outrigger wheel assembly 209 helps to support the frame 160.

One side of the frame 160 is provided with a hinge pin 210 so that the lower section 212 of the frame is pivotally connected to the main portion thereof and a further hinge member 214 further articulates this portion of the frame into the free end portion 216. Spring or suitable tension member 217 normally maintains the frame closed. An actuating lever 218 is secured to the vertical shaft 220 which extends upwardly therefrom through the bearing members 222 and 224 beyond the upper portion of the frame 160 for connection with the crank 226 pivotally connected to the link members 228 and 230 in the manner shown. The link 228 is connected to the clevis joint 232 with the vertical rod 234 rigidly secured at its lower end to the frame portion 212 and it will be noted that the lever 218 is disposed between the rearward spaced ends of the rail members 24 and 26 so that as the post passes therethrough the lever will be engaged to move the links 228 and 230 to an upper position as seen in Figure 4 to swing the portions 212 and 216 of the frame 160 away from the stationary portion thereof so as to allow the post 12 to pass through the frame. This, of course, will effect rotation of the lever member 236 whose end portion is connected respectively between the links 230 and the rod 238, the latter of which extends downwardly therefrom. Suitable bearing means mount on rod 238 a further lever 240 which operates through the link 242 to swing the previously described crank 200 and disengage the friction disk 198 from the sprocket 174, thus interrupting the drive to the discoidal elements and stopping the movement of the cord container 172, the previously described lost motion connection between crank 200 and link 202 preventing actuation of this link and its associated mechanism when the friction drive is interrupted as just described.

In order to make certain that the motion of the discoidal elements 169 is completely stopped when the frame gate is opened, a brake assembly is provided in association with sprocket 174. As seen most clearly in Figure 6, this assembly embodies a generally U-shaped brake bar whose bight portion 180' is rotatably received in a suitable bearing member 182' secured to frame 160. One leg 184' of the brake bar has a downturned end portion 186' received in an elongated slot 188' in an arm member 189' which is rigidly affixed to the rod 238. When rod 238 is rotated during opening of the frame gate, the brake bar is swung downwardly such that its other leg 190' will engage with the teeth of sprocket 174 to prevent further movement of the same. Of course, the normal position of the brake bar is such that the leg 190' will be out of engagement with the sprocket teeth.

When the post member has passed through the vertical stringing assembly, the weight of the articulated frame portions 212 and 216 will swing them inwardly toward the stationary portion of the frame and, of course, the friction disk will once again be engaged with the sprocket 174 to drive the same and effect further stringing of the vertical strand of cord upon the horizontal cord members.

To prevent the discoidal elements from dropping out of the frame 160 when the frame is opened, the assembly shown in Figures 16–19 is utilized. This assembly incorporates a pawl member 200' pivoted on each of the frame portion 160 and 216. The free ends of one side of these frame portions are cut away as shown to allow the hooked end portions 201' of the pawls to project into the channel in which the elements 168 run. The pawls are secured only at their free end portions, as by fasteners 202' to the frame and are formed of resilient material, preferably spring steel or the like. A pair of cam members 203' and 204' are secured to an idler shaft 205' and the rod 238 respectively, the idler shaft being drivingly connected to rod 220 by sprockets and a chain 206', or any other suitable drive, as will be evident. The pawls are normally urged by their inherent resiliency to positions such that their ends will be positioned out of contact with the elements 168. However, when the shafts 220 and 238 are rotated causing opening of the frame gate assembly, the cams will force the free ends of the pawls inwardly into the channel in which elements 168 move whereby the discoidal elements will be held from dropping out of the frame assembly.

For protection, it will be noted that rollers 216' are provided near the abutting ends of the frame portions 160 and 216.

Referring now more particularly to Figure 8, it will be seen that the planting assembly 22 includes the seed box 244 having the usual opening in its bottom as indicated by the reference character 246 over which the slide member 248 is reciprocated so that its aperture 250 will be periodically registered with the previously described opening 246 to allow seed to pass therethrough onto the ground surface. The box 244 is provided with the forwardly extending ears 252 which are pivotally secured to the frame 160 in the manner shown and a lever and sector assembly 254 is provided through the linkage assembly 256 for effecting movement of the seed assembly or planting assembly in a vertical direction toward or away from the ground surface. The slide 248 is provided with a forwardly extending arm 258 terminating in the cross bar 260. A bell crank member 262 is pivoted at an intermediate point to the frame and its inner end is enlarged as at 269 for disposition in the path of movement of the discoidal elements 168 for periodic engagement thereby to effect a reciprocating action to the slide 248 for planting of the seed. Return spring 266 normally positions the free end of the bell crank and the slide in the position shown in Figure 8.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A device for erecting a trellis between spaced upright posts, comprising a frame for attachment at one side of a tractor, first means on said frame for stringing a horizontal cord between said posts and looping the cord about the posts, second means on said frame for wrapping a continuous cord about and between said horizontal cord and an existing horizontal cord spaced from said first mentioned horizontal cord extending between said posts, and means actuated by said last means for planting seed periodically beneath the trellis, and drive mechanisms operating said first and second means, means interconnecting said mechanisms for interrupting operation of the drive mechanism for said second means in response to a predetermined movement of the drive mechanism for said first means.

2. Apparatus for looping cord about spaced parallel flights of cord strung between a series of posts, comprising an articulated looping frame surrounding said parallel flights of cord, means movable on said looping frame for describing a continuous path thereon, a supply of cord carried by said means payable therefrom for looping about said parallel flights, means operating in response to engagement with a post opening said frame to permit passage of the post through the frame.

3. Apparatus for looping cord about spaced parallel flights of cord strung between a series of posts, comprising an articulated looping frame surrounding said parallel flights of cord, means movable on said looping frame for describing a continuous path thereon, a supply of cord carried by said means payable therefrom for looping about said parallel flights, means actuated by engagement with a post to spread said looping frame for passage of each of said posts therethrough.

4. Apparatus for stringing a flight of cord between a series of spaced post members, comprising a frame carrying a pair of laterally spaced rails adapted to be disposed at opposite sides of the posts, a carrier received on said rails and revoluble thereabout carrying a supply of cord payable therefrom for stringing between adjacent posts, means for revolving said carrier, a trip member on said frame engageable with one of the posts when the post is between said rails for actuating said carrier revolving means to move said carrier in a continuous path on said rails whereby the cord is wrapped around the corresponding post.

5. In combination with a tractor, a frame secured in laterally extending relation to said tractor, a pair of spaced semi-circular rail members carried by said frame, a C-shaped carrier received on said rails having its ends registering with opposed ends of said rails presenting a gate through which a series of posts are sequentially passed, a trip member disposed within said gate and connected with the clutch of said tractor to declutch the same when actuated, means responsive to actuation of said trip member for rotating said carrier on said rail members to a position presenting a gate at the rear thereof, means for engaging said clutch when said carrier is in said last position, said carrier supporting a supply of cord for wrapping about and stringing between said posts.

6. In combination with a tractor, a frame secured in laterally extending relation to said tractor, a pair of spaced semi-circular rail members carried by said frame, a C-shaped carrier received on said rails having its ends registering with opposed ends of said rails presenting a gate through which a series of posts are sequentially passed, a trip member disposed within said gate and connected with the clutch of said tractor to declutch the same when actuated, means responsive to actuation of said trip member for rotating said carrier on said rail members to a position presenting a gate at the rear thereof, means for engaging said clutch when said carrier is in said last position, said carrier supporting a supply of cord for wrapping about and stringing between said posts, said posts having a horizontal cord strung therebetween, and means on said tractor for wrapping a cord about the existing horizontal cord and the cord strung by said carrier.

7. In combination with a tractor and a series of posts having cord strung therebetween, first means carried by said tractor for stringing a second cord between said posts, and second means on said tractor for wrapping substantially vertical flights of cord about the first and second cords, planting mechanism carried by said last means and actuated thereby to perform planting of seed beneath the trellis formed by the various cords, a drive mechanism for said first means actuated by the engagement of the first means with a post to loop the second cord around the post, means associated with said drive mechanism for interrupting operation of said second means during a portion of the looping action of said first means.

8. A stringing machine comprising first mechanism for stringing cord between a series of posts, second mechanism for wrapping cord about the first cord and an existing cord between the posts, means associated with said first mechanism for actuating the latter to periodically perform wrapping of cord about said posts, said means including mechanism interrupting the drive to the second mechanism.

9. An attachment for tractors for stringing a cord horizontally between spaced upright posts, comprising a frame for attachment to and lateral extension from a tractor, a post embracing assembly carried by said frame and having gate means for admitting a post thereinto and releasing a post therefrom, said assembly including means thereon for carrying a spool of cord, said assembly including a trip member actuated by a post upon entrance thereof through said gate means, and means rendered operable by actuation of said trip member for revolving said spool carrying means around the embraced post to wrap the cord thereon.

10. A device for erecting a trellis between spaced upright posts comprising a frame for attachment at one side of a tractor, a first mechanism carried by said frame for stringing horizontal cord between the posts, a second mechanism for stringing a trellis forming cord about the horizontal cord, means associated with said first mechanism for actuating the same to periodically perform wrapping of cord about the posts, said means including mechanism interrupting the drive of the second mechanism.

11. Apparatus for looping cord about spaced parallel flights of cord strung between a series of posts comprising a frame adapted to surround the parallel flights of cord, means movable on said frame for describing a continuous path therearound, a supply of cord carried by said means payable therefrom for looping cord about the parallel flights of cord, said movable means comprising a plurality of discoidal elements carried by said frame for movement therearound, one of said elements carrying the cord supply, drive means for moving said discoidal elements.

12. An apparatus for looping cord over parallel flights of wire stretched along a series of spaced posts comprising a frame adapted to surround the parallel flights, elements carried by said frame for movement in a continuous path therearound, drive means for moving said elements carried by said frame, a cord carrying member carried by one of said elements for looping cord over the parallel flights of wire, said frame having a portion thereof openable upon engagement with a post to permit passage of the post through the frame, means interconnecting said openable portion and said drive means for stopping said drive means in response to opening of said openable portion.

13. An apparatus for stretching a cord between a series of posts and looping the cord over each post, said apparatus comprising a post embracing assembly having gate means for admitting a post thereinto and releasing a post therefrom, said assembly including a cord carrying member revoluble around a post embraced by the assembly for looping a cord thereon, means for revolving said cord carrying member, means interconnecting said gate means and said revoluble means operating said revoluble means in response to entrance of a post into the post embracing assembly.

14. A stringing apparatus comprising a horizontal stringing mechanism and a vertical stringing mechanism, means forming a part of said horizontal stringing mechanism for looping a flexible element around each fence post as the mechanism moves the flexible element along a series of fence posts, means interconnecting said first and second mechanisms interrupting the drive to the first mechanism in response to the loop forming movement of said first mechanism.

15. A mechanical stringing apparatus comprising a horizontal stringing mechanism and a vertical stringing mechanism, means operating said vertical stringing mechanism to string a vertical cord about a horizontal cord laid by the horizontal stringing mechanism as the horizontal cord is laid.

References Cited in the file of this patent

UNITED STATES PATENTS

| 569,487 | Dobbs | Oct. 13, 1896 |
| 632,746 | Probasco | Sept. 12, 1899 |
| 643,109 | Carpenter | Feb. 13, 1900 |
| 738,356 | Pugsley | Sept. 8, 1903 |
| 2,541,302 | Slangal | Feb. 13, 1951 |
| 2,547,352 | Wiemers | Apr. 3, 1951 |
| 2,641,084 | Estes | June 9, 1953 |

FOREIGN PATENTS

| 9,940 | France | Sept. 9, 1844 |